United States Patent [19]

Lebret

[11] Patent Number: 5,188,438
[45] Date of Patent: Feb. 23, 1993

[54] ANTI-SKID SYSTEM FOR A MOTOR VEHICLE

[75] Inventor: Pierre Lebret, Le Chesnay, France

[73] Assignee: Bendix Europe Services Techniques, Drancy, France

[21] Appl. No.: 803,000

[22] Filed: Dec. 5, 1991

[30] Foreign Application Priority Data

Dec. 20, 1990 [FR] France .................. 90 16025

[51] Int. Cl.$^5$ .................. B60T 13/16; B60T 8/32
[52] U.S. Cl. .................. 303/116.2; 303/117.1
[58] Field of Search ......... 303/116 SP, 116 B, 116 R, 303/115 PP, 84.1, 84.2, 112, D1–D4

[56] References Cited

U.S. PATENT DOCUMENTS

| | | | |
|---|---|---|---|
| 4,636,009 | 1/1988 | Tsuru et al. | 303/116 SP |
| 4,750,788 | 6/1988 | Seibert et al. | 303/116 SP |
| 4,892,362 | 1/1990 | Takata | 303/117 |
| 5,028,096 | 7/1991 | de le Broise | 303/119 |

FOREIGN PATENT DOCUMENTS

| | | |
|---|---|---|
| 156323 | 10/1985 | European Pat. Off. . |
| 182374 | 5/1986 | European Pat. Off. . |
| 2590217 | 5/1987 | European Pat. Off. . |
| 2636575 | 3/1990 | European Pat. Off. . |
| 376788 | 7/1990 | European Pat. Off. . |
| 3939177 | 6/1990 | Fed. Rep. of Germany . |
| 2218479 | 11/1987 | United Kingdom . |
| 2219055 | 11/1989 | United Kingdom ......... 303/115 PP |

Primary Examiner—Matthew C. Graham
Attorney, Agent, or Firm—Larry J. Palguta; Ken C. Decker

[57] ABSTRACT

The braking system comprises two hydraulic sub-circuits each connecting a driving wheel and a free wheel to a working chamber of a master cylinder (1) and includes a wheel braking anti-lock device comprising, for each of the wheels, a three-way solenoid valve (54, 53, 52, 51) normally opening communication between an inlet of fluid under pressure and the brake motor (34, 33, 32, 31) associated with the wheel, while, in the expansion phase of the anti-lock device, it closes this communication and connects the brake motor to a reservoir (21, 22) of fluid under low prressure for each sub-circuit, a switching slide (11, 12) isolating the brake motors from the working chamber of the master cylinder during the functioning of the pump (46, 45) is associated with the anti-lock device. It comprises, furthermore, a control slide (63, 61) which, at rest, determines a direct communication between the brake motor (33, 31) of the free wheel and the working chamber of the master cylinder (1) and which interrupts this communication when the pressure of the fluid in the brake motor (33, 31) of the free wheel is higher than a particular value.

4 Claims, 2 Drawing Sheets

ANTI-SKID SYSTEM FOR A MOTOR VEHICLE

BACKGROUND OF THE INVENTION

The present invention relates to an anti-skid system for the driving wheels of a motor vehicle, the braking system of which comprises two hydraulic subcircuits each connecting a driving wheel and a free wheel to a working chamber of a master cylinder connected to a general reservoir of fluid under low pressure and includes a wheel braking anti-lock device.

Such a system is described, for example, in DE-A-3,910,285. However, the system of this document has serious disadvantages. In fact, it first of all requires a comprehensive modification of the associated pneumatic brake booster, since the pressure applied to the brake fluid is generated by the master cylinder which thus simulates a depression of the brake pedal by the driver. Moreover, in the anti-lock system, the brake fluid recovered in the expansion phase is conveyed directly to the reservoir, which means that, in the event of the failure of the associated pump, there is no longer any means of braking the vehicle, except by releasing the pedal, to ensure the resupply of the chambers of the master cylinder, and then to depress this pedal again, which is essentially contrary to the normal reflex of even a skilled driver.

SUMMARY OF THE INVENTION

An object of the present invention is to provide a simpler and more reliable anti-skid system, the number of solenoid valves of which is strictly limited and which does not require any modification to be made to the components of the brake circuit, the purpose of this being, moreover, to reduce its cost substantially.

The invention therefore applies essentially to a brake circuit including an anti-lock device comprising, for each of the wheels, a three-way solenoid valve normally opening communication between an inlet of fluid under pressure and the brake motor associated with the wheel, while, in the expansion phase of the anti-lock device, it closes this communication and connects the brake motor to a reservoir of fluid under low pressure specific to each sub-circuit, and, for each sub-circuit, a switching slide isolating the brake motors from the working chamber of the master cylinder during the functioning of the pump associated with the anti-lock device, in the anti-lock mode said pump sucking the fluid from the corresponding specific reservoir.

According to the invention, the system comprises, furthermore, a control slide which, at rest, determines a direct communication between the brake motor of the free wheel and the working chamber of the master cylinder and which interrupts this communication when the pressure of the fluid in the brake motor of the free wheel is higher than a particular value.

According to one aspect of the invention, the control slide determines, furthermore, communication between the delivery outlet of the pump and the working chamber when the pressure of the fluid in the brake motor of the free wheel is higher than a particular value.

This control slide replaces the additional solenoid valve conventionally used in anti-skid systems.

BRIEF DESCRIPTION OF THE DRAWINGS

The invention will now be described by way of example with reference to the accompanying drawings in which.

DETAILED DESCRIPTION OF THE INVENTION

Figure 1:
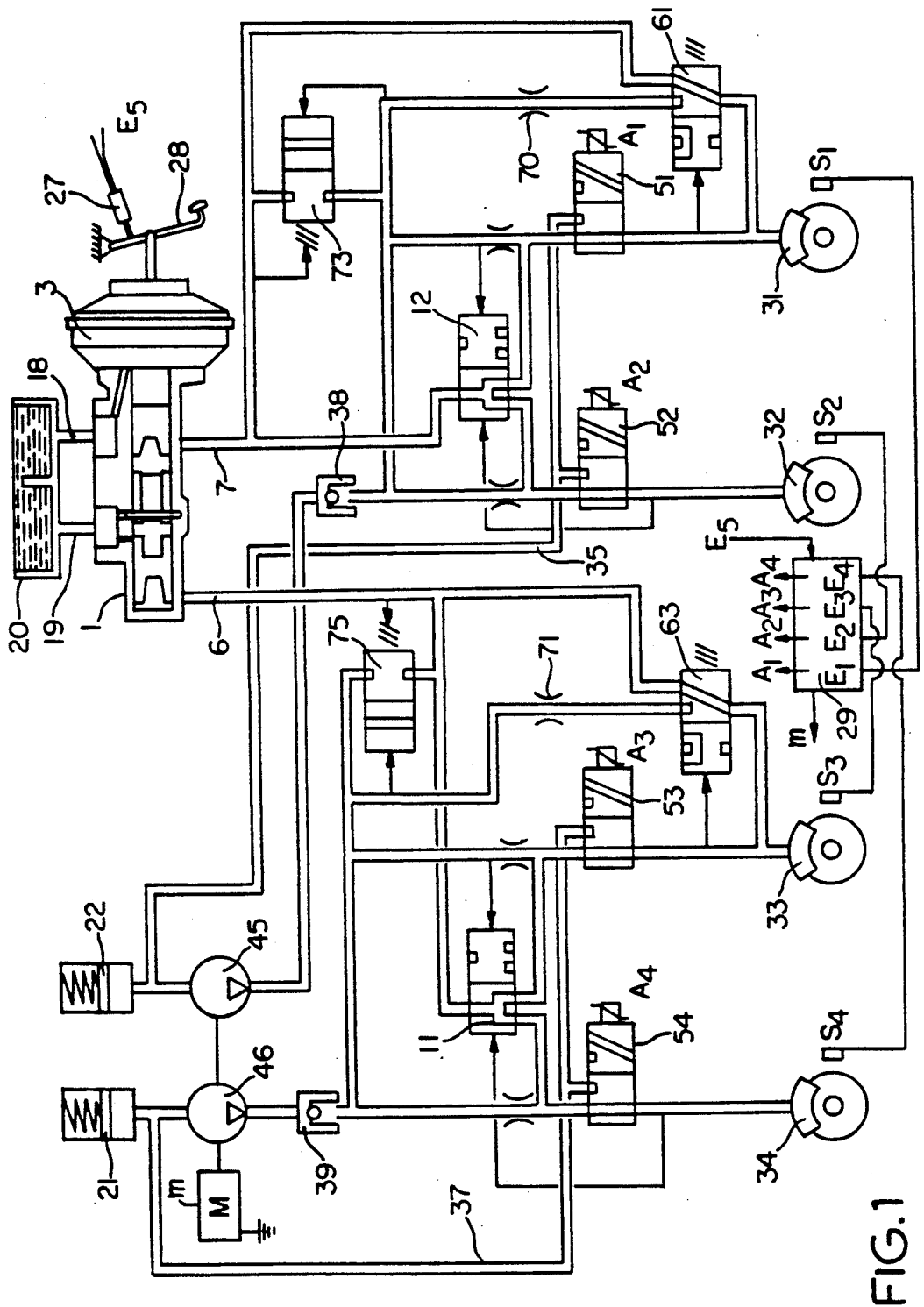
FIG. 1 shows diagrammatically a braking system including the invention.

Referring now to FIG. 1, the brake circuit comprises in a conventional way a pneumatic brake booster 3 actuated by a pedal 28 equipped with an electrical detector 27 which detects its actuation and which is connected by means of the wire E5 to the central electronic control unit 29. The brake booster 3 actuates a tandem master cylinder 1, shown diagrammatically, the two chambers of which are supplied with fluid under low pressure by a reservoir 20 by way of the conduits 18 and 19 respectively. The outlet conduits 6 and 7 of the two respective chambers of the master cylinder 1 determine the two hydraulic sub-circuits called respectively the secondary and the primary.

The conduit 6 or 7 is connected, at rest, to the brake motors 34, 33 or 32, 31 of a driving wheel 34, 32 and of a free wheel 33, 31 respectively by means of a hydraulic slide 11 or 12 and two three-way and two-position solenoid valves 54, 53 and 52, 51 respectively. When they are energized, the solenoid valves 54, 53 and 52, 51 respectively cut off the above-mentioned connection and put the associated brake motor 34, 33 or 32, 31 in communication with a specific reservoir of reduced content, specifically a capacity 21 or 22, by way of a conduit 37 or 35 respectively.

This energization is controlled by the central unit 29 when a risk of locking is detected by the respective corresponding sensors S4, S3 and S2, S1, each associated with a wheel.

In the event of such a detection, the central unit 29 ensures that the motor M driving the pumps 46, 45 is started up by means of the electrical conductor m. These pumps suck the expanded fluid from the capacity 21, 22 in order to deliver a fluid under pressure to the relevant brake motors 34, 33, 32, 31 by means of a non-return valve 39, 38, as soon as the associated solenoid valve 54, 53, 52, 51 is back in the rest position.

When the pump 46, 45 is started up, the corresponding chamber of the master cylinder is isolated from the hydraulic sub-circuit by means of the differential valve 11, 12 consisting of a switching slide, on either side of which are applied the pressure prevailing in the brake motor of the driving wheel 34, 32 and the pressure generated by the pump 46, 45.

Another differential valve 63, 61 consisting of a control slide, one face of which receives the pressure prevailing in the brake motor 33, 31 of the free wheel and the other face of is loaded by a spring, brings, when at rest, into communication with one another the brake motor 33, 31 and the conduit 6, 7 leading to the master cylinder and to the reservoir. When a hydraulic pressure greater than the action of the force generated by the spring is established in the brake motor 33, 31 of the free wheel, the control slide is displaced and cuts off this communication.

This system functions as follows. In the simple braking mode, the valves are in the position shown, except the valves 63, 61 which close, and the fluid under pressure is applied to all the brake motors. In the event that an immediate locking of a wheel is detected, the associated solenoid valve is energized, as is the pump motor.

Figure 2:
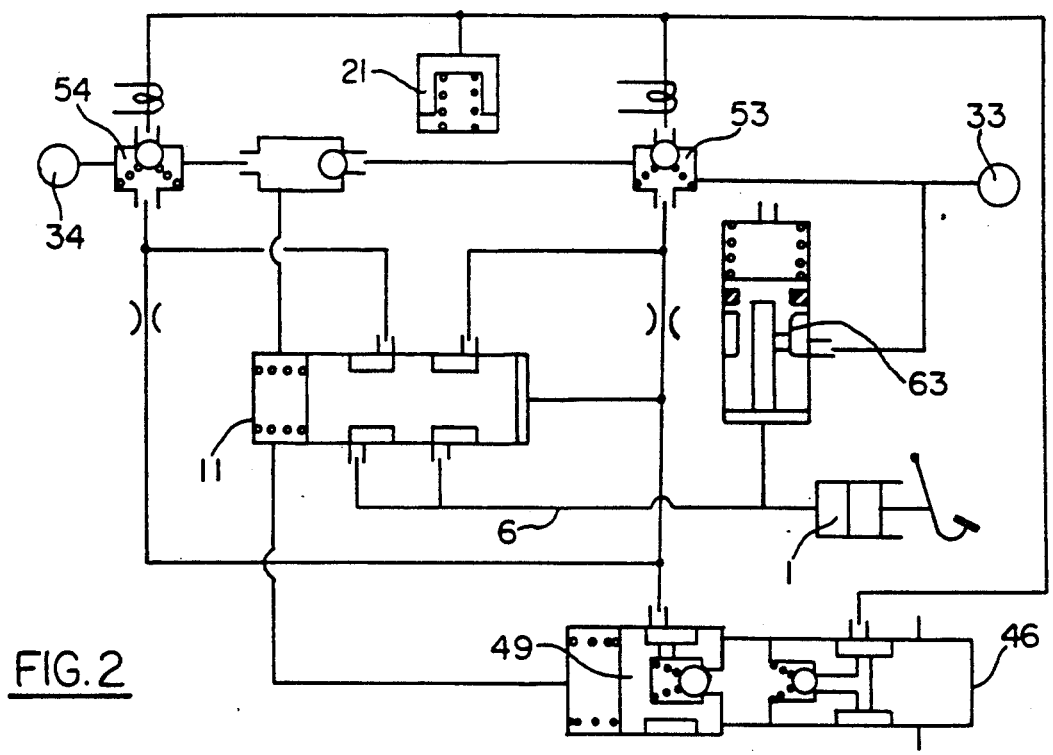
FIGS. 2 and 3 show diagrammatically and partially two preferred embodiments of hydraulic subcircuits.

The fluid in the relevant brake motor expands into the associated capacity, from where it is immediately sucked by the pump in order, in respect of a conventional pump (FIG. 3), to be returned to the master cylinder by way of a restriction 71, 70 or stored in an outlet chamber of the pump (FIG. 2).

In the event of the failure of the pump, the master cylinder remains in communication with the brake motors, only the fluid contained in the relevant capacity is lost, and the vehicle can still be braked at the expense of a slightly longer travel of the brake pedal 28.

When the sensors detect a skid of a driving wheel, only the solenoid valve of the associated free wheel is energized and the corresponding pump is started up. As an example, if the wheel having the brake motor 34 skids, the central unit easily detects it from the difference in rotational speed of the wheels associated with the secondary sub-circuit and from the fact that the detector 27 has not signalled the driver's intention to brake. The solenoid valve 53 is then energized and the pump 46 started up. Because pressure is absent in the brake motor 33, the differential valve 63 remains at rest and the pump 46 sucks the fluid by way of the conduit 37, the solenoid valve 53, the differential valve 63, the conduit 6, the corresponding chamber of the master cylinder 1, and the conduit 19 from the reservoir 20 of fluid under low pressure. The fluid under low pressure coming from the pump 46 isolates the master cylinder 1 from the circuit supplying fluid under high pressure by means of the differential valve 11 and is applied to the brake motor 34 of the skidding driving wheel.

If the driver wishes to brake during an anti-skid cycle, the detector 27 picks up the information and transmits it to the central unit 29 which then stops the supply to the motor of the pump 46 and de-energizes the solenoid valve 53. The pressure generated in the master cylinder 1 acts on the differential valve 63 in order to cut off direct communication between the conduit 6 and the brake motor 33.

The addition of a differential valve 75, 73 makes it possible to limit the outlet pressure of the pump.

Figure 3:
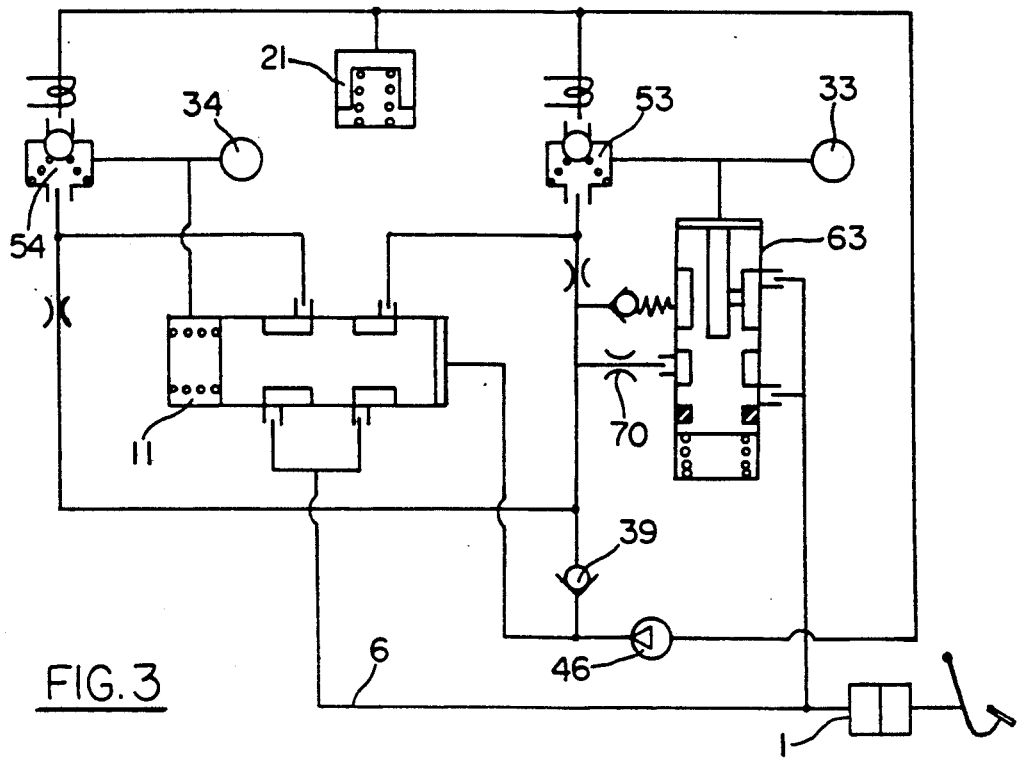

FIGS. 2 and 3 illustrate diagrammatically two embodiments of a sub-circuit. The references used are the same as those used in relation to FIG. 1.

In FIG. 2, the proportional valve 11 receives, on one of the faces of its slide, the higher pressure of the pressures prevailing in the two brake motors 34, 33. This pressure is likewise applied to a piston 49 carrying the delivery shutter of the pump 46, making it possible to inhibit the pump 46, especially in the expansion period of the anti-lock cycle, and to limit the pressure which it generates. The slide of the differential valve 63 is loaded, at rest, by a simple pre-calibrated spring, since the bore is open to the atmospheric pressure. In FIG. 3, the pump 46 is of a conventional type and the limitation of its outlet pressure is ensured by means of the differential valve 63 which has a second way capable of returning the fluid under pressure emitted by the pump towards the master cylinder by way of a restriction 70, when the pressure in the brake motor 33 reaches a value determined by the calibration of the spring loading the slide of this differential valve. In the anti-skid phase, the solenoid valve 53 serves as a pressure relief valve.

It will have been appreciated that many changes and modifications can be made to the present invention by an average person skilled in the art, without departing from the scope of the accompanying claims.

What we claim is:

1. An anti-skid system for the driving wheels of a motor vehicle, a braking system of which comprises two hydraulic sub-circuits each connecting a driving wheel and a free wheel to a working chamber of a master cylinder connected to a general reservoir of fluid under low pressure and includes a wheel braking anti-lock device comprising, for each of the wheels, a three-way solenoid valve normally opening communication between an inlet of fluid under pressure and a brake motor associated with the respective wheel, while, in an expansion phase of the anti-lock device, the solenoid valve closes the communication and connects the brake motor to a reservoir of fluid under low pressure specific to each sub-circuit, and, for each sub-circuit, a switching slide isolating the brake motors from the working chamber of the master cylinder during the functioning of a pump associated with the anti-lock device, in the anti-lock mode said pump sucking the fluid from said reservoir specific to the sub-circuit, said anti-skid system further comprising a control slide which, at rest, puts in direct communication the brake motor of a free wheel and the associated working chamber of said master cylinder and which interrupts such communication while putting in communication a delivery outlet of the pump and said associated working chamber when the pressure of the fluid in the brake motor of said free wheel is higher than a particular value.

2. The anti-skid system according to claim 1, wherein communication between the delivery outlet of the pump and said working chamber is made by way of a restriction.

3. The anti-skid system according to claim 1, wherein said control slide slides in a bore, of which one end is connected to a low-pressure source and the other to the brake motor of said free wheel.

4. The anti-skid system according to claim 3, wherein a prestressed spring returns said control slide to rest counter to the pressure in the brake motor of said free wheel.

* * * * *